United States Patent [19]

August et al.

[11] Patent Number: 5,633,922
[45] Date of Patent: May 27, 1997

[54] PROCESS AND APPARATUS FOR RESTARTING CALL ROUTING IN A TELEPHONE NETWORK

[75] Inventors: Katherine G. August, Matawan; Albert Friedes, East Brunswick, both of N.J.

[73] Assignee: AT&T, Middletown, N.J.

[21] Appl. No.: 581,707

[22] Filed: Dec. 29, 1995

[51] Int. Cl.[6] .................. H04M 7/00; H04M 15/00; H04M 3/42

[52] U.S. Cl. ............ 379/220; 379/127; 379/207; 379/211; 379/230

[58] Field of Search ............ 379/201, 207, 379/210, 211, 219, 220, 221, 229, 230, 242, 243, 273, 127

[56] References Cited

U.S. PATENT DOCUMENTS

| | | | |
|---|---|---|---|
| 4,757,267 | 7/1988 | Riskin | 379/219 X |
| 5,136,636 | 8/1992 | Wegrzynowicz | 379/207 |
| 5,237,604 | 8/1993 | Ryan | 379/220 |
| 5,311,572 | 5/1994 | Friedes et al. | 379/230 X |

*Primary Examiner*—Thomas W. Brown
*Assistant Examiner*—Harry S. Hong
*Attorney, Agent, or Firm*—Stephen M. Gurey

[57] ABSTRACT

A telecommunications system is configured for restarting a telephone call within a telephone network as the call is processed from an originating station progressively through the telephone network. The system determines that the originally dialed number is not associated with optimum processing of the call to a desired final destination. A determination based on call identifier information stored at a telephone network switch or database involves analyzing the call identifier information for caller input or indications of equipment type. A determination can also be made based on messages or data received relating to operational conditions of the switching network; or, data relating to and describing a destination, such as equipment type or services and features available.

16 Claims, 3 Drawing Sheets

PROCESS AND APPARATUS FOR RESTARTING CALL ROUTING IN A TELEPHONE NETWORK

TECHNICAL FIELD

This invention relates generally to a telecommunications system, and more particularly to telephone call routing in a telecommunications system.

BACKGROUND OF THE INVENTION

Many companies are segregated into specialized groups, business units, or functional units each having trained agents and specialized operations centers functioning independently to manage incoming calls. Call routing staff within these specialized units carefully observe the number of calls coming into each call center, the time each agent remains on line with a caller, the completion rate for a service being provided, and other items important to profitability. Call routing staff determine how incoming traffic will be routed in the telephone network.

Most people who call such a segregated company are not familiar with that company's structure and organization. For instance, it is unlikely that the potential customer knows that sales are handled by one group having a first telephone number while service is handled by another group having a second telephone number, or that service might actually be handled by different groups having different telephone numbers depending upon, for example, the date of purchase or the product model purchased. Consumers often dial a number associated with one major department or business unit while actually being interested in speaking with a representative from a different department.

Decision making logic for routing telephone calls within a company can be modeled as a tree structure or other database structure. The number of services provided by many companies causes call routing decisions to be extremely complex. Incoming calls have numerous potential destination branches.

To help insure that each call is correctly routed, many companies utilize call prompting, which can be performed by call routing staff or within the telephone network, to prevent misdirected calls. Callers are asked if they are calling for sales, billing, repair, etc., with associated responses entered using the telephone keypad or voice commands detected by speech recognition.

Call prompting reduces the number of misdirected calls. However, the caller is often instructed by staff or the prompting system to hang up and dial another number associated with the division or service truly desired. The caller is often annoyed at having to place more than one call, or if the caller is unable to understand the prompting instructions well enough to dial the correct number the second time, such an instruction could cause a company to lose valuable good will and numerous business clients. Also, highly trained call processing agents should be prevented from spending time on a call that has been sent into their office but cannot actually be properly processed there and to which they can add no special value.

It should be noted that information affecting call routing may change on a regular basis. Such information may be generated as a result of (a) adding or deleting locations to which a call can be routed, (b) the addition or deletion of equipment in the telephone network, or (c) equipment problems or emergencies within the switching network, or at called locations. For example, during an emergency, incoming telecommunications traffic for various offices of a company might be rerouted by call processing agents. This is because changes to decision making routing databases caused by emergencies often do not provide enough time for multiple departments to coordinate.

Information affecting call processing can also come from an intended call recipient, as in the case when the subscriber takes a trip and wants to send calls to a colleague or alternate number; or, it can come from the caller, as in the case when it is determined that the caller wishes to be connected with a particular business division or service; or, that he wishes to send a fax or data. Such call processing information can also come from the telephone network, e.g., when a new network control point is added to the telephone network, or when an update is performed.

SUMMARY OF THE INVENTION

We have recognized that without human intervention, heretofore an incoming call cannot be restarted after it has been determined that the originally dialed number is not associated with the actual destination desired by a caller when the databases for routing the calls to the originally dialed number and the actual desired destination do not have access to the data records containing the routing logic for direction to the available department.

An advance in the art of processing telephone calls is achieved, in accordance with the principles of the invention, by automatically restarting a voice or data telephone call during processing in a telecommunications network when it is determined, before the telephone call is routed to a destination or service, that the originally dialed number is not associated with the desired or appropriate destination for the telephone call. By restarting it is meant that the telephone call is routed using new call destination information as if the call was just received at the switch. Such destination information may be expressed as a translatable telephone number.

In an exemplary embodiment of the invention, a telephone call which may be carrying voice, data, or a combination thereof, is presented to a switching system of the telephone switching network. The switch stores information describing the call, e.g., dialed number and calling number, and queries a database, such as a network control point (NCP) to determine where to route the telephone call. In response to the query and the call descriptive information stored at the switch, a data record in the database is accessed to provide logic for routing the call to a destination in the telephone network.

Routing logic for the destination number in the accessed data record, or provided by an updatable control routine stored in one or more other databases, determines that (a) the call should be directed to a destination corresponding to a different telephone number than the one dialed, or (b) that a different database record of one or more other databases should be accessed. This determination can, for example, be based upon: a caller listening to prompts and selecting an option by entering data designed to discriminate misdirected callers; a potential call recipient selecting a feature or service to activate or change routing of telephone calls; or, a network traffic management system or disaster recovery system determining that the call routing information will not result in a call completion, or an expeditious, satisfactory call completion.

A destination code is returned to the querying switch. In accordance with an aspect of the invention, the destination code may be (a) an identifier of a destination to which the call can be routed, or (b) a telephone number or identifier corresponding to a callable station not corresponding to the originally-dialed number and to which the call cannot be directly routed without further translation. If the destination code is a destination to which the call can be routed, the switch operates to complete the call routing process. If the destination code is not one to which the switch can directly route the call, a command to restart the call is sent to the querying switch. Restarting the telephone call uses the new destination code, such as a new telephone number, to route the telephone call as if the call was just received at the querying switch.

When restarted, the switch initiates call processing responsive to the received destination code and the stored information descriptive of the call. Such processing can include: (a) further queries to (i) an NCP, (ii) an adjunct, or (iii) customer premises databases; or, (b) rerouting of the call to another switch, passing along information that has been stored.

DETAILED DESCRIPTION

In accordance with the principles of the invention, a telecommunications system is configured to automatically restart a voice or data telephone call within the telephone network as the call is processed in the telephone network when it is determined that the originally dialed number is not associated with the caller's actual desired final destination. By restarting it is meant that the telephone call is routed as if the call was just received at the switch using new call destination information. The determination may be based on analyzing call identifier information, which means information describing the call such as calling number, caller entered information, e.g., a caller entered character or a voice input, calling equipment type, and dialed number. The determination may also be made based on messages or data received by the database relating to operational conditions of the switching network, or data relating to and describing a destination, such as equipment type or services and features available.

Telephone service in the United States is provided by interconnecting carriers. The initial carrier providing telephone service is typically a local exchange carrier (LEC). The subsequent carrier is often an interexchange telephone carrier.

Figure 1:
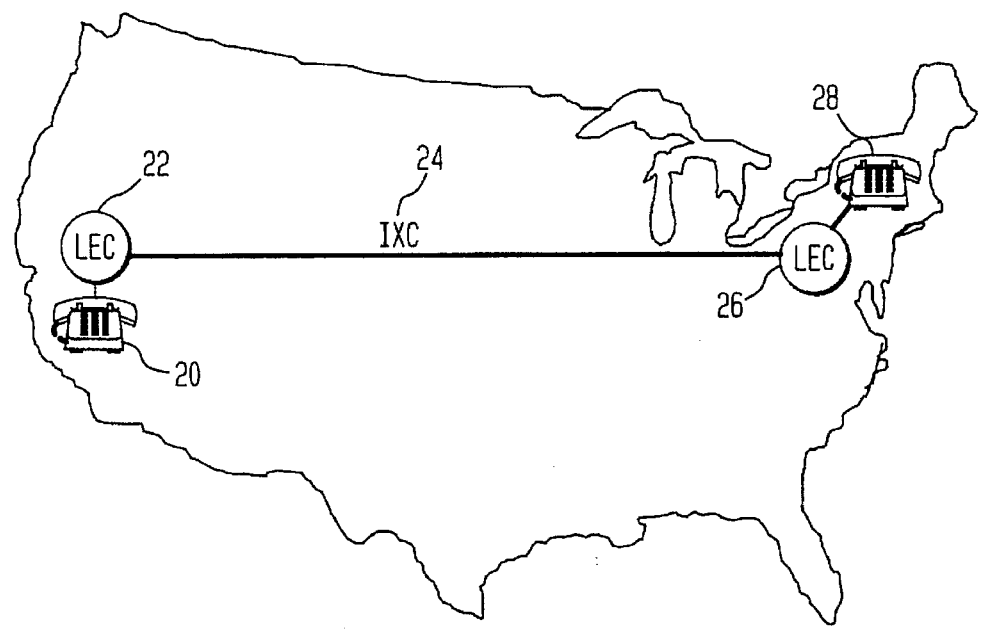
FIG. 1 shows a representation of a telephone call routed from a local exchange carrier through an interexchange carrier to a destination.

When subscriber 20 to local telephone service from local exchange carrier (LEC) 22 initiates a long-distance call, the call is generally routed through LEC 22, over switched interexchange communication network 24 providing long distance voice and data services, and ultimately through LEC 26 which has as one of its subscribers terminating subscriber 28, as shown in FIG. 1. A business customer's communications equipment can also be connected directly to the interexchange network, such equipment is denoted "customer premises equipment" (CPE).

Figure 2:
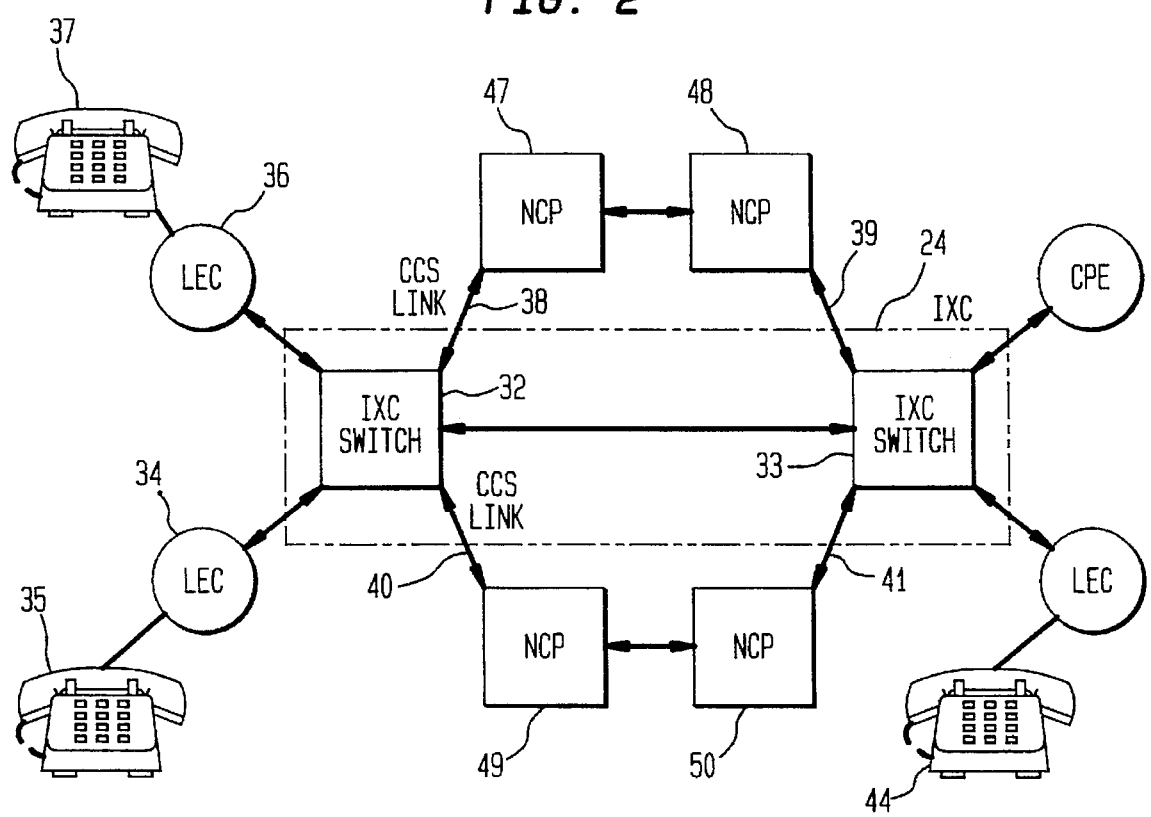
FIG. 2 shows a representation of a telecommunications system for restarting a telephone call in a telephone network in accordance with the principles of the invention.

Referring to FIG. 2, switched interexchange network 24 includes interconnected interexchange switches 32, 33, such as 4ESS electronic switching systems from AT&T. Each interexchange switch is capable of serving a number of LECs or CPEs. LEC 34 connects an originating calling station 35 that has dialed a particular telephone number to switch 32. Similarly, LEC 36 is coupled for receiving the telephone call from switch 32 and completing the call to intended station 37. A switch can similarly support customer premises equipment.

A Common Channel Signaling (CCS) System, which includes logical CCS connections 38, 39, 40, and 41 couples interexchange network 24 to a number of databases, such as, for example, Network Control Points (NCP) 47, 48, 49, and 50. NCPs and other databases support services and features provided to subscribers and callers in the telephone network, such as "800" toll-free long distance calling.

Figure 3:
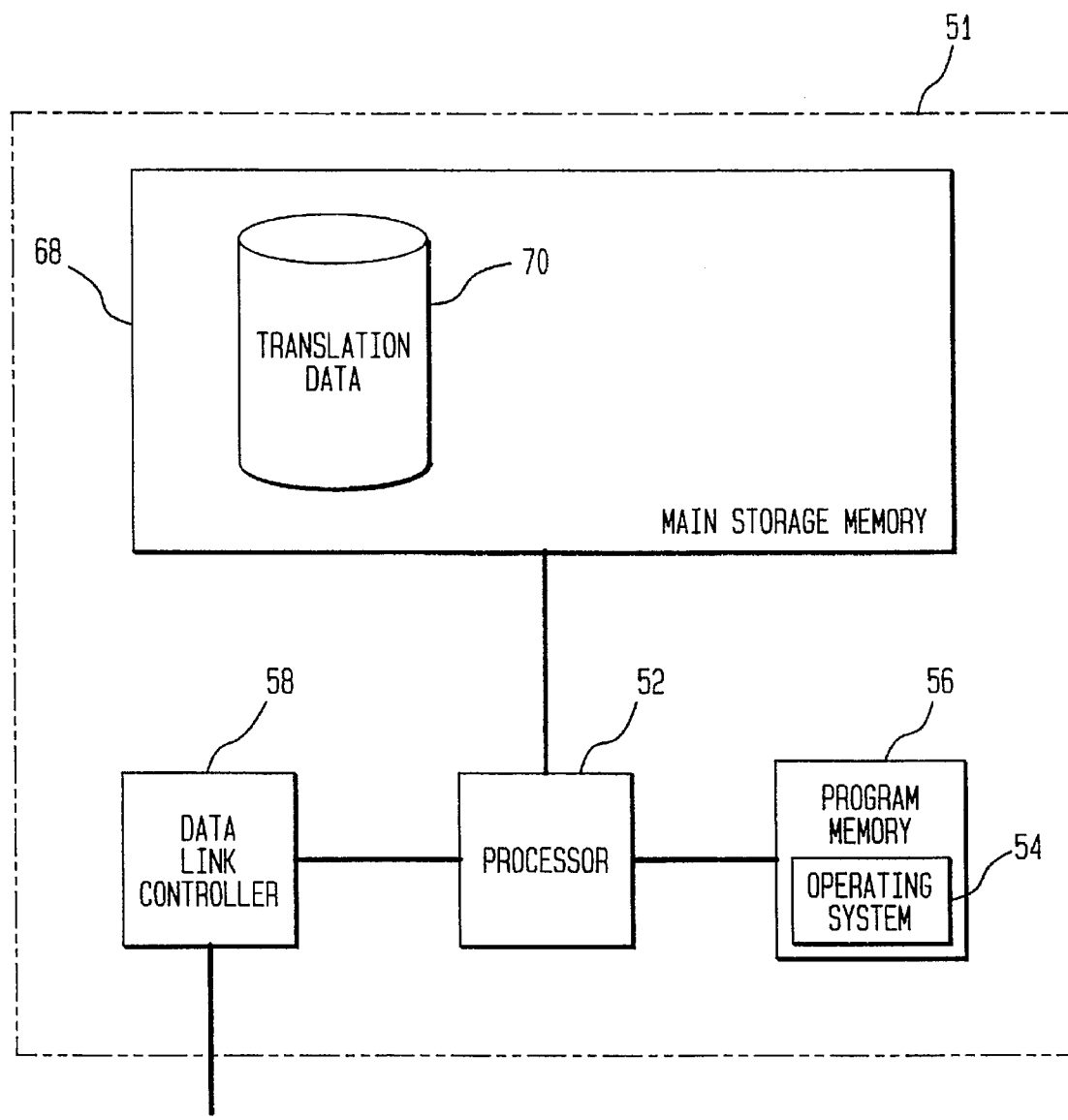
FIG. 3 shows a representation of a database in the telecommunications system depicted in FIG. 2 in accordance with the principles of the invention.

Referring to FIG. 3, database 51 (such as NCP 47 in FIG. 2) includes (a) processor 52, which operates under the control of an operating system program 54 stored in program memory 56, and (b) a datalink controller 58 which operates to transmit and receive messages external to database 51. Data-base 51 also includes main storage memory 68.

Main storage memory 68 contains translation data 70, which may include logic trees or other routing logic, used to translate a telephone number accompanying a query into a destination code upon receipt of the query. The destination code may be (a) an identifier of a destination to which the call can be routed, or (b) a telephone number or identifier corresponding to a callable station not corresponding to the originally-dialed number and to which the call cannot be directly routed without further translation, in accordance with the principles of the invention. If the destination code is a destination to which the call can be routed, the switch operates to complete the call routing process.

Various paths and branches in the logic trees may indicate routing and processing to be implemented under special circumstances, or indicate instructions and prompting to be implemented in response to the call identifier information. Some such paths of the logic tree, when followed, may ultimately require a restarting of the call.

Logic tree and other data records stored in main storage memory 68 (FIG. 3) can be updated and/or augmented in response to (a) changing call traffic patterns, (b) emergencies and equipment failures, (c) changes in protocol or provisioning, or (d) a predetermined schedule. The destination code is generated as a result of following the logic tree and other data records. Thus, the need to restart particular calls can be specified in the routing logic in response to communications from outside of the database. The communications are entered through the datalink controller 58 (FIG. 3) in main storage memory 68.

Call identifier information is stored and continuously maintained at the one of network switches 32, 33 (FIG. 2) that is routing the call. Any NCPs, adjuncts, and CPE databases accessed during the routing process, can determine that a call should be restarted, in accordance with an aspect of the invention, and, if so, what telephone number should be used when the call is restarted.

A telephone caller dials a translatable telephone number for a business, e.g., a toll-free "800" number. LEC 34 establishes a connection to switch 32 in the interexchange network 24 and passes the digits forming the dialed "800" number to switch 32. Responsive to receipt of the digits, switch 32 queries NCP 47 to determine the destination of the received call and maintains call identifier information describing the call. The query may include data which identifies (a) the network switch, (b) the originally dialed telephone number, (c) other portions of the call identifier information, and (d) a previously returned destination code. In response to the query and the accompanying call identifier information, the database, e.g., NCP 47, accesses a translation data record from translation data 70 of FIG. 3, to retrieve a logic tree or other types of call routing information. Then, the database uses the routing logic to determine whether (a) the call should be routed based on the originally-dialed number, or (b) the call should be restarted because (i) it will be routed to a destination not actually desired, and therefore not actually originally indicated by the caller, or (ii) a business or other emergency necessitates restarting the call, in accordance with an aspect of the invention.

In particular, in the absence of indications that the call will not be completed to the desired destination, the voice or data telephone call is routed according to the retrieved routing logic. If it is determined that the call should be restarted to more appropriately service the caller, the call is restarted so as to appear to the telephone network as though the call was newly received without requiring any action by the caller. Optionally, when restarted, the information collected previously during the processing of the call may become part of the call identifier information.

Switch 32 operates to process the voice or data telephone call in accordance with the received destination code. Optionally, the destination code can include an explicit command for the switch 32 to direct the call to a subsequent switch 33 (FIG. 2) for further processing or restarting. In that case, the first switch 32 routes the voice or data telephone call to the subsequent switch 33 identified by the destination code, and passes the destination code and the call identifier information to the second switch 33. Upon receipt of the destination code and call identifier information, which is stored and maintained in memory at the subsequent switch 33, the second switch may operate to repeat the process carried out by the first switch.

Those of ordinary skill in the art will note that the database(s) need not be remote, that each database may be centrally located or located within a switch, and that databases may be arranged at the convenience of the implementer.

Any database which translates the telephone number of the call may respond to data indicating that the route to the destination is blocked and restart the call to retranslate the telephone number with the benefit of the maintained call identifier information.

Figure 4:
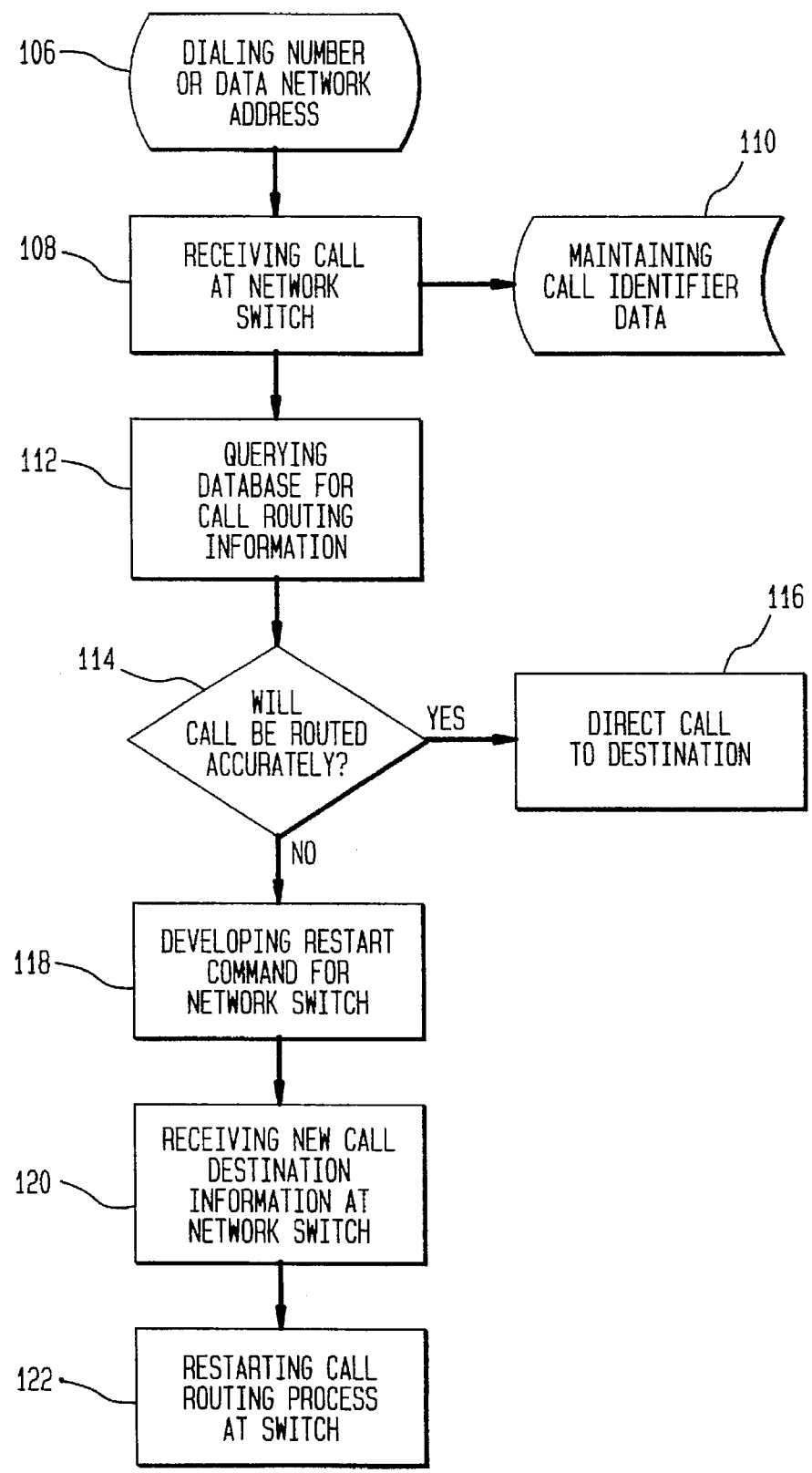
FIG. 4 shows a flowchart of an exemplary process for restarting a telephone call in a telephone network in accordance with the principles of the invention.

FIG. 4 shows an exemplary process for use in routing a call in accordance with the present invention. As shown in FIG. 4, a caller at a calling station dials a telephone number or data network address in step 106. The call is received at a network switch in step 108. The call identifier information is stored in the network switch in step 110, which thereafter maintains the call identifier information thereat. The network switch queries a database for call routing information in step 112. The database determines whether the call will be routed accurately by accessing a data record for routing logic corresponding to the dialed number or data network address in step 114. The routing logic retrieved may indicate prompts or instructions relating to the voice or data telephone call in accordance with an aspect of the invention.

Using the call identifier information responsive to any prompts, network status information, and any other available information, the database decides whether the call will be routed to the destination actually desired by the caller. If the decision is yes, the database directs the network switch to route the call to the destination retrieved from the database in step 116. If the decision is no, then the database develops a command instructing the network switch to restart the call within the telephone network using new call destination information in step 118. The network switch receives the new call destination information in step 120, and restarts the call in step 122.

This new method of routing calls in the telephone network enables a company with more than one telephone number to direct an incoming call from a dialed business division to another business division having a different telephone number, even when each division has a respective particular logic tree record stored in different, non-communicating databases corresponding to their different telephone numbers. Importantly, this is accomplished without requiring human intervention (a) to redirect the call or (b) to instruct the caller to hang up and dial the different telephone number; and, even though the business divisions and the databases for each business division telephone number are geographically diverse.

Importantly, in accordance with an aspect of the invention, the data resources of multiple, different, and often geographically dispersed databases can be utilized to process a call. Multiple queries from one or more network switches coupled throughout the network during changing traffic routing conditions make the resources of multiple databases available and accessible for routing calls to a useful destination. Advantageously, a company with more than one translatable telephone number can move an incoming call that is proceeding toward a particular division based on processing that utilizes a logic record stored in a particular database for the dialed telephone number to another company division having a different telephone number and corresponding routing logic stored in another database without having to instruct the caller to hang-up and dial the different telephone number even when the various divisions and the databases are geographically diverse. Consequently, callers receive prompt and accurate service and companies subscribing to this telecommunication service receive a higher percentage of calls directed to an appropriate division.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed:

1. A call routing process for routing a telephone call initiated by a caller through a switching network to a telephone number, comprising the steps of:

(A) storing call identifier information at a network switch;

(B) using at least the telephone number to query a database for call routing information;

(C) determining in the database whether the telephone call will be routed to a destination actually desired by the caller;

(D) obtaining new call destination information in response to a determination that the telephone call will not be routed to the destination actually desired by the caller; and (E) before the call is completed, restarting the call routing process at the network switch using the new call destination information, wherein said restarting includes the steps of
 (i) routing the telephone call along a route toward a new destination which corresponds to the new call destination information,
 (ii) forwarding the call identifier information with the telephone call along the route to the new destination, and
 (iii) storing the call identifier information at the new destination.

2. The invention as defined in claim 1, wherein step (C) includes steps selected from the group consisting of:
 receiving a signal generated in response to caller action; and
 receiving a message from a switching network element that the call cannot be completed as routed.

3. The invention as defined in claim 1, wherein:
 said determining of step (C) is based on a received signal generated to change a call routing logic tree.

4. The invention as defined in claim 1, wherein step (D) comprises the step of:
 determining an alternate translatable telephone number that corresponds to a destination actually desired by the caller; and wherein the process includes subsequent to step (E)
 routing the telephone call based on the alternate translatable telephone number.

5. The invention as defined in claim 4, wherein the call identifier information is utilized in the step of routing the telephone call based on the alternate translatable telephone number.

6. The invention as defined in claim 1, wherein:
 at least a portion of the call identifier information is captured as part of the call routing process.

7. The invention as defined in claim 1, wherein the call identifier information is selected from the group consisting of:
 an indication of the calling telephone number;
 the called telephone number;
 an equipment type for the telephone call;
 caller input; and
 data returned in response to a query to a database.

8. The invention as defined in claim 7, wherein:
 said caller input is selected from the group consisting of voice response information and caller entered character information.

9. The invention as defined in claim 1, wherein step (C) comprises the steps of:
 passing the call identifier information to one or more other databases; and
 retrieving the new call destination information from the one or more other databases.

10. An apparatus for restarting a telephone call within a switching network and routing the telephone call to a destination, comprising:
 a network switch for processing the telephone call that is operative to
 (i) query a database for call routing information and to store and transmit call identifier information, wherein at least a portion of the call identifier information is captured as part of the process of routing the telephone call, and
 (ii) restart the telephone call and access one or more other databases for new call destination information responsive to a command to restart the telephone call;
 means for determining before the call is completed whether or not the telephone call will be routed to the destination actually desired by a caller;
 means for generating call routing information to the destination actually desired in response to a determination that the telephone call will be routed to the destination actually desired by the caller; and
 means for initiating a restarting of the telephone call without requiring any action by the caller in response to a determination that the telephone call will not be routed to the destination actually desired by the caller.

11. The invention as defined in claim 10, wherein:
 the means for initiating generates the new call destination information and the command to restart the telephone call.

12. The invention as defined in claim 10, wherein:
 the new call destination information includes a telephone number indicating a new destination for the telephone call.

13. The invention as defined in claim 10, wherein:
 the means for determining includes a logic tree for routing the telephone call.

14. The invention as defined in claim 10, wherein the new call destination information is selected from the group consisting of:
 a network routing number;
 a dialable telephone number; and
 combinations thereof.

15. An apparatus for restarting a telephone call within a switching network and routing the telephone call to a destination, comprising:
 a first network switch for processing the telephone call that is operative to
 (i) query a database for call routing information and to store and transmit call identifier information, and
 (ii) restart the telephone call and access one or more other databases for new call destination information responsive to a command to restart the telephone call;
 a first database that is operative to
 (i) generate call routing information in response to a query from the first network switch,
 (ii) determine before the call is completed whether or not the telephone call will be routed to the destination actually desired by a caller, and
 (iii) develop a command instructing the first network switch to restart the telephone call within the switching network;
 a second database that is operative to
 (i) generate the new call destination information, and
 (ii) return the new call destination information to the first network switch; and
 a second network switch corresponding to the new call destination information that is operative to
 (i) receive the call identifier information accompanying the restarted telephone call through a route in the switching network from the first network switch, and
 (ii) store the call identifier information.

16. The invention as defined in claim 15, wherein:
 the first database and the second database are geographically diverse.

* * * * *